(12) United States Patent
Di Giovanni et al.

(10) Patent No.: US 9,937,571 B2
(45) Date of Patent: Apr. 10, 2018

(54) SHUTTLE SYSTEM TO MOVE STRAPPED/BUNDLED MATERIAL FOR SAWING

(71) Applicant: HYD-MECH GROUP LIMITED, Woodstock (CA)

(72) Inventors: Walter Di Giovanni, Fano (IT); Wieslaw Raczynski, Woodstock (CA); Zbigniew E. Pasiak, Woodstock (CA); Robin Van Schaayk, London (CA)

(73) Assignee: Hyd-Mech Group Limited, Woodstock, Ontario (CA)

( * ) Notice: Subject to any disclaimer, the term of this patent is extended or adjusted under 35 U.S.C. 154(b) by 0 days.

(21) Appl. No.: 15/344,470

(22) Filed: Nov. 4, 2016

(65) Prior Publication Data

US 2017/0129027 A1    May 11, 2017

Related U.S. Application Data

(60) Provisional application No. 62/252,041, filed on Nov. 6, 2015.

(51) Int. Cl.
*B23D 55/04* (2006.01)

(52) U.S. Cl.
CPC .......... *B23D 55/043* (2013.01); *B23D 55/04* (2013.01); *B23D 55/046* (2013.01)

(58) Field of Classification Search
CPC ...... B23D 55/043; B23D 55/00; B23D 55/02; B23D 55/026; B23D 55/04; B23D 55/046; B23D 53/00; Y10T 83/04; Y10T 83/2196; Y10T 83/2198; Y10T 83/44; Y10T 83/445; Y10T 83/4539; Y10T 83/4451; Y10T 83/5669; Y10T 83/6576; Y10T 83/707; Y10T 83/727; Y10T 83/7487; Y10T 83/95
See application file for complete search history.

(56) References Cited

U.S. PATENT DOCUMENTS

| | | | | | |
|---|---|---|---|---|---|
| 3,474,693 | A | * | 10/1969 | Cleland | B23D 53/04 83/420 |
| 4,329,894 | A | * | 5/1982 | Stolzer | B23D 47/02 83/156 |

(Continued)

*Primary Examiner* — Phong Nguyen
(74) *Attorney, Agent, or Firm* — Womble Bond Dickinson US LLP

(57) ABSTRACT

There is provided in a preferred embodiment an apparatus for feeding an elongated material in a direction substantially generally along a length thereof to a cutting device having a cutting surface. The apparatus includes a lifting base assembly and a material shuttling assembly secured on the pivoting base assembly, the latter defining a feeding path. The lifting base assembly has a lower base portion and an upper base portion hingedly coupled to the lower base portion along a base pivoting axis generally parallel to and laterally offset from the feeding path. The upper base portion is selectively rotatable about the pivoting axis relative to the lower base portion between a level position and a lifted position, wherein in the lifted position, the material is raised above the cutting surface in an angled orientation where the material is further raised along a first lateral end portion relative to a second lateral end portion opposed to the first lateral end portion, the second lateral end portion being proximal to the pivoting axis.

26 Claims, 10 Drawing Sheets

(56) References Cited

U.S. PATENT DOCUMENTS

| | | | | |
|---|---|---|---|---|
| 5,044,236 A | * | 9/1991 | Mills | B23D 55/04 |
| | | | | 269/131 |
| 5,353,910 A | * | 10/1994 | Harris | B23D 47/042 |
| | | | | 198/345.1 |
| 7,111,720 B1 | * | 9/2006 | Harris | B23D 55/04 |
| | | | | 198/345.1 |
| 2017/0120406 A1 | * | 5/2017 | Jourdan | B23Q 7/042 |

* cited by examiner

SHUTTLE SYSTEM TO MOVE STRAPPED/BUNDLED MATERIAL FOR SAWING

SCOPE OF THE INVENTION

The present invention relates to an apparatus for moving or feeding an elongated material, such as but not limited to a bundle of metal pipes, tubes or bars (hereinafter collectively referred to as "elongated metal pieces" or "metal pieces"), to a cutting device having a cutting surface, and which is intended for reducing sliding contact between the material and the cutting surface during operation.

BACKGROUND OF THE INVENTION

In various industries, multiple elongated metal pieces are often cut simultaneously to a desired length using a band saw, while the metal pieces are held together in a bundle with one or more straps along the length of the metal pieces. A number of industrial assemblies have been developed in the past for such cutting operations, and which generally include a feeding apparatus coupled to a band saw (such as a vertical, horizontal or scissors-type band saw) in a manner that allows for the feeding apparatus to move the bundled metal pieces longitudinally to the band saw. The feeding apparatus and the band saw may operate in an automated process to cut the metal pieces into shorter work pieces by moving the bundled metal pieces a preselected distance past a band saw blade and cutting the metal pieces to a desired length, and repeating the process.

It has been appreciated that using straps to hold the metal pieces together may present challenges during movement to the band saw, such as the straps damaging or getting caught on the band saw or a band saw component. For example, the straps may scrape the surface of a band saw cutting table or get caught on band saw vises. Such unintended events during movement of the metal pieces could introduce inaccuracies in the automated cutting operation, and further add to maintenance/service costs and time.

A number of different approaches or solutions have been proposed in the past to address the foregoing challenges. For example, it has been suggested to weld the longitudinal ends of the metal pieces together and remove the straps prior to loading on the feeding apparatus. Such approach suffers disadvantages in that the welding operation increases overall processing time and reduces reliability and reproducibility in subsequently moving the metal pieces to the band saw. Another approach has been to introduce chamfering to the band saw vises and cutting table. Such approach however exposes the band saw vises and cutting table to greater wear and tear over time, and thus, increasing maintenance and service costs.

SUMMARY OF THE INVENTION

It is a non-limiting object of the present invention to overcome the shortcomings associated with existing feeding apparatuses for moving elongated metal pieces to a band saw, and which may permit for cutting of the metal pieces without necessarily requiring removal of any straps or welding the metal pieces together.

It is a further non-limiting object of the present invention to provide an apparatus for feeding elongated metal pieces to a cutting device, and which may permit for reduction of wear and tear to the cutting device, as well as the time and costs associated with the cutting and maintenance/repair operations.

It is a further non-limiting object of the present invention to provide a feeding apparatus for moving an elongated material to a cutting device, and which may permit for improved accuracy and precision in automated cutting of the material to a desired length.

In one aspect, the present invention provides an apparatus for feeding an elongated material in a direction substantially along a length of the material to a cutting device having a cutting surface, the apparatus comprising a pivoting base assembly and a material shuttling assembly secured on the pivoting base assembly, the material shuttling assembly having a receiving end and a feeding end defining a material feeding path extending therebetween, wherein the shuttling assembly is for effecting movement of the material towards the feeding end, and the feeding end is positionable proximate the cutting device in a coupled arrangement, wherein: the pivoting base assembly comprises a lower base portion and an upper base portion hingedly coupled to the lower base portion along a pivoting axis substantially parallel to and laterally offset from the feeding path, wherein the upper base portion is selectively rotatable about the pivoting axis relative to the lower base portion between a level position and a lifted position, and the shuttling assembly comprises a material supporting member defining a material supporting plane along the feeding path, and a pair of opposed shuttling vises for selectively holding or clamping the material therebetween in the lifted position and moving the material over the supporting member along the plane towards the feeding end, wherein in the lifted position, the material supporting plane is raised above the cutting surface in an angled orientation, thereby permitting said movement of the material towards the feeding and the cutting device in the coupled arrangement by the shuttling vises substantially without sliding contact or with partial sliding contact between the material and the cutting surface, wherein in the angled orientation, the plane is raised along a first longitudinal edge relative to a second longitudinal edge opposed to the first longitudinal edge, the second longitudinal edge being proximal to the pivoting axis.

In another aspect, the present invention provides an apparatus for feeding an elongated material generally along a length thereof towards a cutting device having an upwardly oriented cutting surface, the apparatus having a material shuttling assembly for effecting longitudinal movement of the material along a feeding path towards the cutting device, and a lifting base assembly coupled to the material shuttling assembly for effecting partial rotational movement thereof, wherein: the lifting base assembly comprises a lower base portion and an upper base portion hingedly coupled to the lower base portion along a base pivoting axis generally parallel to and laterally offset from the feeding path, the upper base portion being selectively rotatable about the base pivoting axis relative to the lower base portion between a level position and a lifted position, and the material shuttling assembly comprises a material feeding track member coupled to the upper base portion and a pair of opposed shuttling vises selectively movable relative to the track member along the feeding path, the track member at least partially defining a material supporting plane along the feeding path, and the shuttling vises being operable for holding or clamping the material therebetween and moving the material on the track member along the feeding path and over the supporting plane towards the cutting device when the upper base portion is in the lifted position, wherein in the lifted position, the material supporting plane is raised relative to the cutting surface in an angled orientation thereto, whereby the supporting plane is further raised along a first lateral end portion relative to a second lateral end portion opposed to the first lateral end portion, the second lateral portion being proximal to the base pivoting axis, and thereby permitting the longitudinal movement of the material over the cutting surface substantially without sliding contact or with partial sliding contact therebetween.

In yet another aspect, the present invention provides An apparatus for feeding a material towards a cutting device having an upwardly oriented cutting surface, the apparatus having a material shuttling assembly for effecting movement of the material along a feeding path towards the cutting device, and a lifting base assembly coupled to the material shuttling assembly for effecting partial rotational movement thereof, wherein: the lifting base assembly is selectively rotatable about a base pivoting axis generally parallel to and laterally offset from the feeding path between a level position and a lifted position, and the material shuttling assembly comprises a material feeding track member coupled to the lifting base assembly and a pair of opposed shuttling clamping members selectively movable on the track member along the feeding path, the track member at least partially defining a material supporting plane along the feeding path, and the shuttling clamping members being operable for clamping the material therebetween and moving the material on the track member along the feeding path and over the supporting plane towards the cutting device when the material shuttling assembly is in the lifted position, wherein in the lifted position, the material supporting plane is raised relative to the cutting surface in an angled orientation thereto, whereby the supporting plane is further raised along a first lateral end portion relative to a second lateral end portion opposed to the first lateral end portion, the second lateral portion being proximal to the base pivoting axis, and thereby permitting the movement of the material over the cutting surface substantially without sliding contact or with partial sliding contact therebetween.

In yet another aspect, the present invention provides a material cutting assembly for cutting an elongated material along a length thereof, the material cutting assembly comprising the apparatus of the present invention and the cutting device coupled or positioned adjacent thereto.

In yet another aspect, the present invention provides a method for feeding an elongated material generally along a length thereof towards a cutting device having a upwardly oriented cutting surface, the method comprising: placing the elongated material on the material feeding track member of the apparatus of the present invention and between the shuttling vises with the length of the material in general alignment with the feeding path; actuating the shuttling vises to clamp the material therebetween and rotating the upper base portion relative to the lower base portion towards the lifted position; moving the shuttling vises and the material clamped therebetween a predetermined distance towards the cutting device substantially without sliding contact or with partial sliding contact between the material and the cutting device, whereby a predetermined cutting length of the material is positioned over the cutting surface; and rotating the upper base portion relative to the lower base portion towards the level position, thereby placing the material on the cutting surface.

In one embodiment, the material feeding track member comprises a material receiving end and a material feeding end, the feeding path extending between the material receiving and feeding ends, and the material feeding end being positionable adjacent to the cutting device, wherein in the level position, the material supporting plane is substantially coplanar with the cutting surface.

It is to be appreciated that specific mechanisms for moving the shuttling vises towards the feeding end or the receiving end is not limited. In one embodiment, the shuttling assembly further comprises a servomotor and a rack and pinion, the rack being coupled to the shuttling vises and the pinion being selectively actuable by the servomotor to drive the rack and the shuttling vises coupled thereto towards the feeding end or the receiving end. In an alternative embodiment, the shuttling vises may be moved along the feeding path using a ball screw mechanism, where the shuttling vises are coupled to an internally threaded ball in complementary threaded engagement with an elongated screw along the feeding path, and the shuttling vises are movable towards the feeding end or the receiving end with rotational movement of the ball or the screw.

In one embodiment, the shuttling assembly further comprises a pair of opposed squaring vices for guiding or orienting the material on the material feeding track member along the feeding path, the squaring vices being fixedly located preferably on the material feeding track member adjacent to the receiving end, wherein the shuttling vises are selectively movable between the squaring vises and the feeding end.

It is to be appreciated that the shuttling vises and the squaring vises are not restricted to specific embodiments, configurations, placements or movements, provided that the vises are operable to feed the material along the feeding path to the cutting device. By way of non-limiting examples, the shuttling vises comprise generally opposed first and second shuttling vises, and likewise, the squaring vises comprise generally opposed first and second squaring vises, wherein the first vises are disposed along the first longitudinal edge or the first lateral end portion, and the second vises are disposed along the second longitudinal edge or the second lateral end portion. In one embodiment, the first and/or second shuttling vises are selectively movable substantially normal to the feeding path, and towards or away from the other vise, and likewise, the first and/or second squaring vises are selectively movable substantially normal to the feeding path, and towards or away from the other vise.

Preferably, both said second vises are movably disposed along the first longitudinal edge or the second lateral end portion, and both said first vises are fixedly disposed along the second longitudinal edge or the first lateral end portion, such that in the lifted position, the material is at least partially resting against the material supporting or feeding track member and the second vises. In such embodiment, the first vises operate as datum vises operable to transversely align the elongated material along the feeding path against a predetermined datum line. To effect such alignment against the datum line, the datum vises may be provided with limited transverse mobility with for example transversely oriented hydraulic cylinders operably coupled to outer peripheries of associated datum vises.

In one embodiment, each said vise comprises a respective inwardly oriented contacting surface for, in the case of the shuttling vises, frictional engagement with the material in the movement of the material towards the feeding end or along the feeding path, and, in the case of the squaring vises, for defining respective lateral outermost boundaries for the material at least partially during the same movement.

In one embodiment, the shuttling assembly further comprises transversely extending squaring and shuttling vise tracks each defining a respective upwardly oriented track surface, the squaring vises being disposed on the track surface of the squaring vise track and the shuttling vises being disposed on the track surface of the shuttling vise track, wherein the track surfaces and the supporting or feeding track member cooperatively define the upper material supporting plane.

It is to be appreciated that depending on for example the total length of the material, the shuttling assembly may include further components to facilitate stabilization of the material on the feeding apparatus during for example movement of the material towards the cutting device. In one non-limiting embodiment, the shuttling assembly further comprises an upper clamping arm selectively movable towards the shuttling vise track to urge the material thereto at least partially during the movement of the material towards the feeding end or cutting device, the upper clamping arm being movable in tandem with the shuttling vises and the shuttling vise track.

It is to be appreciated that the material supporting or feeding track member is not strictly limited, provided it operates to either alone or together with the vise tracks to define the material supporting plane and support the material thereon during the movement of the material towards the cutting device. In one embodiment, the material feeding track member defines an elongated downwardly open recess substantially aligned with the feeding path, and the material shuttling assembly further comprises one or more material supporting rollers rotatable about a respective rotation axis oriented substantially normal to the feeding path, the rollers being fixedly or movably disposed in the recess along the feeding path to receive the material thereon along the material supporting plane and at least partially assist the longitudinal movement of the material towards the cutting device. In one embodiment, the material supporting member comprises one or more material supporting rollers selectively rotatable about a respective rotation axis oriented substantially normal to the feeding path, the rollers being selectively movable between the receiving end and the feeding end to receive the material thereon along the plane and assist said movement of the material towards the feeding end.

In one embodiment, an uppermost end portion of each said roller is raised relative to the vise track surfaces, such that a greater portion of the load from the material is exerted on the rollers than that on the vise tracks. In one embodiment, the shuttling assembly includes two or more of the rollers, and the rollers are selectively movable along the feeding path with movement of the shuttling vises, such that the rollers are generally evenly spaced between the squaring vises and the shutting vises. As a rearmost end of the material is moved past the squaring vises towards the cutting device, the rollers are preferably movable with the material towards the cutting device to ensure that all said rollers are supporting the material, and the rollers are generally evenly spaced along the length of the material being supported on the feeding apparatus. In one embodiment, the shuttling assembly comprises between 1 and 30, preferably between 2 and 10, or more preferably 2 said supporting rollers.

In an alternative embodiment, the material supporting member includes a conveyor selected from the group consisting of a gravity roller conveyor, a gravity skatewheel conveyor, a belt conveyor, a wire mesh conveyor or a plastic belt conveyor.

The cutting device compatible for use with the apparatus of the current invention is not particularly limited. In one embodiment, the cutting device comprises a vertical, horizontal or scissors type band saw. In one embodiment, the band saw further includes a fixed band saw vise extending upwardly from the cutting surface, the fixed band saw vise being positionable in the coupled arrangement generally along the first longitudinal edge, wherein in the lifted position, the apparatus is positionable to effect the movement of the material substantially without sliding contact or with partial sliding contact between the material, and the cutting surface and the fixed band saw vise. In one embodiment, the band saw comprises a fixed band saw vise and a transversely movable band saw vise each extending upwardly from the cutting surface, wherein the band saw is positionable adjacent to the apparatus with the fixed band saw vise located proximal to the first lateral end portion of the material supporting plane.

In one embodiment, one said shuttling vise is a datum shuttling vise, the apparatus being positionable adjacent to the band saw with the datum shuttling vise substantially aligned with the fixed band saw vice in the level position proximal to the first lateral end portion of the material supporting plane, wherein in the lifted position, the datum shuttling vise is tilted transversely inwardly towards the feeding path relative to the fixed band saw vice, thereby permitting the longitudinal movement of the material over the cutting surface substantially without sliding contact or with partial sliding contact between the material, and the cutting surface and the fixed band saw vise.

In one embodiment, the material comprises a plurality of metal bars or tubes and one or more bundling straps, the bundling straps holding the bars or tubes in a bundled arrangement, wherein the bars or tubes have a length between about 1 inch and about 100 feet, preferably between about 20 inches and about 80 feet or more preferably between about 26 inches and about 60 feet. In one embodiment, the bundled bars or tubes have a total height between about 5 inches and about 80 inches, preferably between about 10 inches and about 60 inches, or more preferably about 20 inches, and a total width between about 5 inches and about 80 inches, preferably between about 10 inches and about 60 inches, or more preferably about 20 inches. It is to be appreciated however that the material is not limited as such, and may in the alternative, include a single elongated bar or tube, and which may include for example lateral curvatures or deformations introduced during the manufacturing process.

The dimensions of the apparatus are not limited to specific ranges, and may be adjusted depending on the dimensions of the material to be fed to the cutting device. In one embodiment, the apparatus has a length between about 10 inches and 150 inches, preferably between about 20 inches and about 120 inches, more preferably between about 26 inches and about 80 inches, or most preferably between about 30 inches and about 60 inches. In one embodiment, the maximum width of the feeding path is between about 6 inches and about 90 inches, preferably between about 15 inches and about 70 inches, or more preferably between about 20 inches and about 30 inches. In one embodiment, the vertical distance from the ground to the material supporting plane in the level position is between about 20 inches and about 60 inches, preferably between about 30 inches and about 50 inches, or more preferably between about 35 inches and about 35 inches.

As noted above, the applicant has appreciated that the apparatus may permit for feeding of the material to the cutting device while reducing or eliminating sliding contact with the cutting surface or the fixed band saw vise, and thus, also reducing or eliminating the possibility of the material or the bundling straps being jammed or getting caught during feeding. In one embodiment, in the lifted position, the first longitudinal edge is raised relative to the cutting surface between about 0.05 inch and about 1.5 inch and the second longitudinal edge is raised relative to the cutting surface between about 0.01 inch and about 1.0 inch, and the material during the movement is distanced transversely or inwardly from the fixed band saw vise between about 0.05 inch and about 1.5 inch. In one embodiment, in the lifted position, the first lateral end portion of the material supporting plane is raised relative to the cutting surface between about 0.05 inch and about 1.5 inch, the second lateral end portion is raised relative to the cutting surface between about 0.01 inch and about 1.0 inch, and the datum shuttling vise is inwardly distanced transversely from the fixed band saw vise between about 0.05 inch and about 1.5 inch. In one embodiment, the pivoting axis is offset laterally outwardly from the second longitudinal edge or the second lateral end portion. In one embodiment, the pivoting axis is generally vertically aligned with the second longitudinal edge or the second lateral end portion.

In one embodiment, the base assembly comprises a hinge coupled to the lower and upper base portions, the hinge defining the pivoting axis, and a lifting cylinder coupled to the lower and upper base portions transversely distal to the pivoting axis, wherein the lifting cylinder is for rotating the upper base portion relative to the lower base portion about the pivoting axis towards the lifted position to effect partial rotational movement therebetween. Preferably, the hinge comprises a clevis hinge assembly having a pair of thrust needle bearings, a clevis coupled to one said base portion, a tang coupled to other said base portion and a clevis pin rotatably coupling the clevis and the tang, wherein the clevis comprises a pair of clevis arm portions, and the clevis pin is received through respective coaxial clevis pin receiving apertures defined by the clevis arm portions, the tang and the thrust needle bearings, each said thrust needle bearings being interposed between an associated one of said clevis arm portions and the tang. Preferably, the clevis hinge assembly further comprises a plurality of set screws and a pair of pressure thrust washers, each said pressure thrust washers being disposed adjacent to an associated one of said clevis arm portions and in abutting contact with an associated one of said thrust needle bearings, wherein the set screws are received through associated screw receiving bores defines by the clevis arm portions to urge inwardly against associated said pressure thrust washers. The applicant has appreciated that such construction of the hinge may permit for reduction or elimination of relative movement of the upper base portion other than rotational movement.

In one embodiment, the lifting base assembly further comprises a base pivoting hinge coupled to the lower and upper base portions proximal to the second lateral end portion of the material supporting plane, the hinge defining the base pivoting axis, and the lifting base assembly further comprises a lifting actuator coupled to the lower and upper base portions proximal to the first lateral end portion opposite the base pivoting axis, wherein the lifting actuator is for rotating the upper base portion relative to the lower base portion about the pivoting axis towards the lifted position. In one embodiment, the base pivoting hinge comprises a clevis hinge assembly having a pair of thrust needle bearings, a clevis coupled to one said base portion, a tang coupled to other said base portion and a clevis pin rotatably coupling the clevis and the tang, wherein the clevis comprises a pair of clevis arm portions, and each said thrust needle bearing is interposed between an associated one of said clevis arm portions and the tang. In one embodiment, the clevis hinge assembly further comprises a plurality of set screws and a pair of pressure thrust washers, each said pressure thrust washer being disposed adjacent to an associated one of said clevis arm portions and in abutting contact with an associated one of said thrust needle bearings, wherein the set screws are received through associated screw receiving bores defines by the clevis arm portions to urge inwardly against associated said pressure thrust washers.

It is to be appreciated that the lifted position, and therefore, the material supporting plane may be varied depending on dimensions of the material by for example varying the relative locations, orientations and/or dimensions of the pivoting axis, the lifting cylinder, the base assembly and/or the cutting device. Adjustment of the lifted position may be performed as part of an automated process for feeding and cutting the material by for example conducting a preliminary scan of the shape and dimensions of the material.

In one embodiment, in the level position the material supporting surface is substantially co-planar with the cutting surface, and the first and second longitudinal edge or the first and second lateral end portions are at a substantially identical vertical position with respect to the ground.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
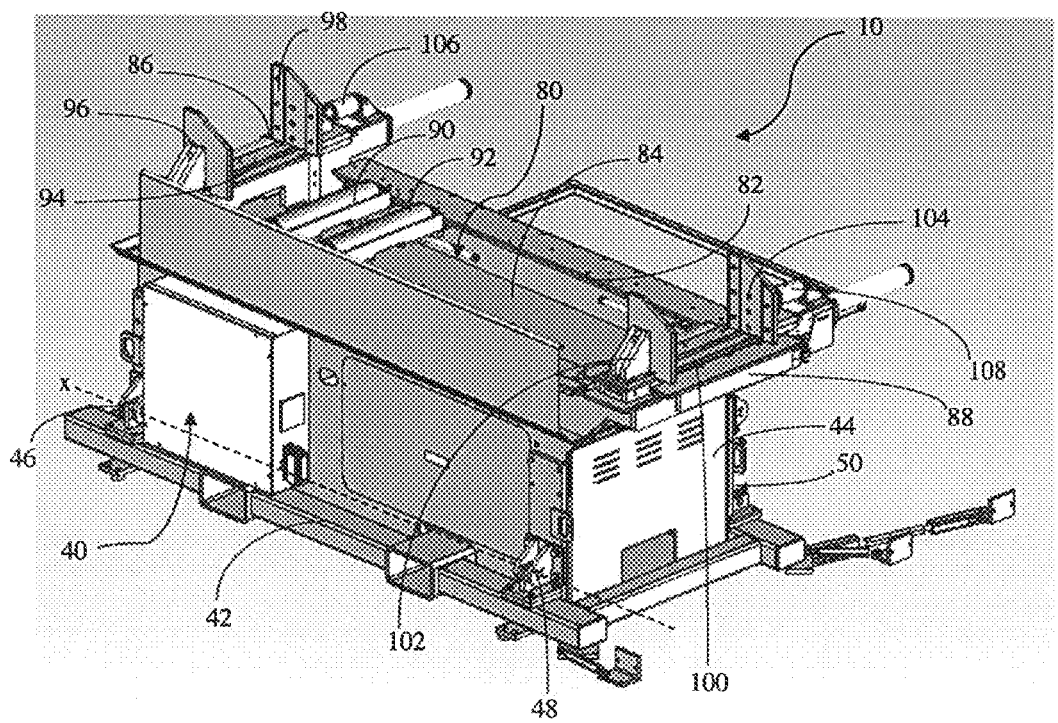
FIG. 1 is a perspective view of a feeding apparatus in accordance with a preferred embodiment of the present invention.

Reference is made to FIG. 1 which shows a perspective view of a feeding apparatus 10 for feeding an elongated pipe or pipes in accordance with a preferred embodiment of the present invention. In the construction shown, and as will be further detailed below, the feeding apparatus 10 includes a lifting base assembly 40 and a pipe shuttling assembly 80 secured on the lifting base assembly 40. For more complete illustration of the feeding apparatus 10, the apparatus 10 is shown in isolation without a vertical band saw 300 coupled to the apparatus 10.

Figure 2:
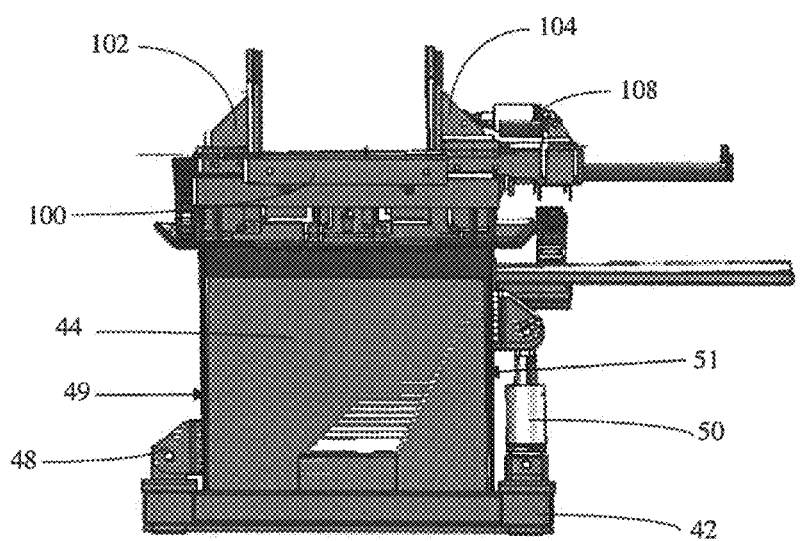
FIG. 2 is a front elevation view of the feeding apparatus shown in FIG. 1.

The lifting base assembly 40 includes a lower base support frame 42 of generally rectangular shape for placement on a ground, and a rotatable upper base platform 44 sized for nested seated placement on the lower base support frame 42. The upper base platform 44 has a generally hollow interior for housing various electrical or mechanical components of the feeding assembly 10 required for its operation. As shown in FIGS. 1 and 2, the base platform 44 is rotatably coupled to the support frame 42 by base pivoting hinges 46, 48 disposed along a first lateral portion 49 of the lifting base assembly 40, and which define a common rotating axis x. The support frame 42 and the base platform 44 are further coupled along a second opposed lateral portion 51 by lifting hydraulic cylinders 50 (the other cylinder not shown), each of the lifting cylinder being located at a position generally transversely opposed to that of an associated one of the pivoting hinges 46, 48. As will be further discussed below, the lifting cylinders are selectively movable between a retracted position and an extended position to effect relative rotational movement of the base platform 44 between a level position and a rotated position.

Figure 3:
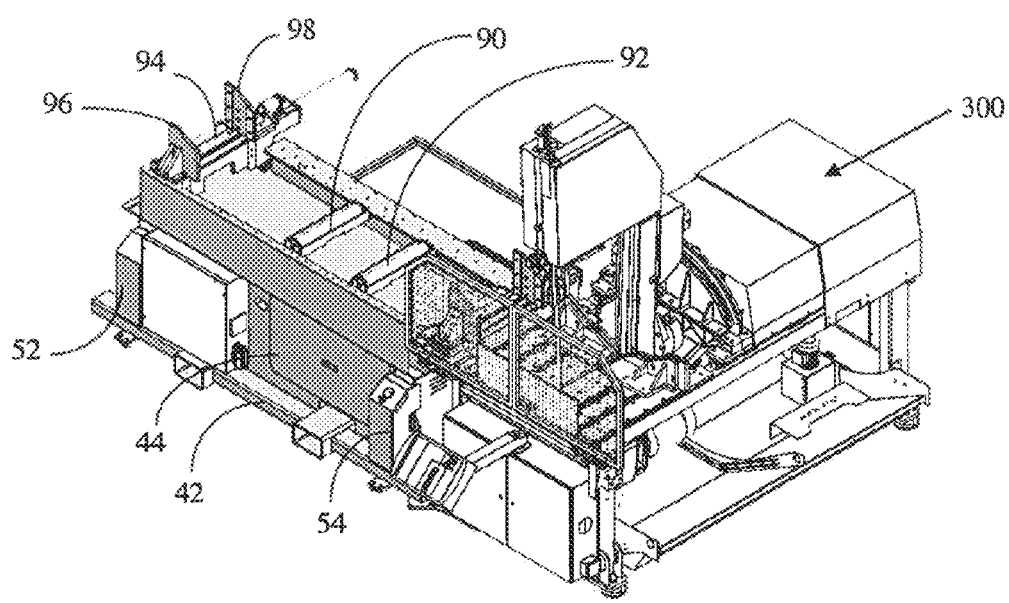
FIG. 3 is a perspective view of the feeding apparatus shown in FIG. 1 in an operational engagement with a vertical band saw.
Figure 4:
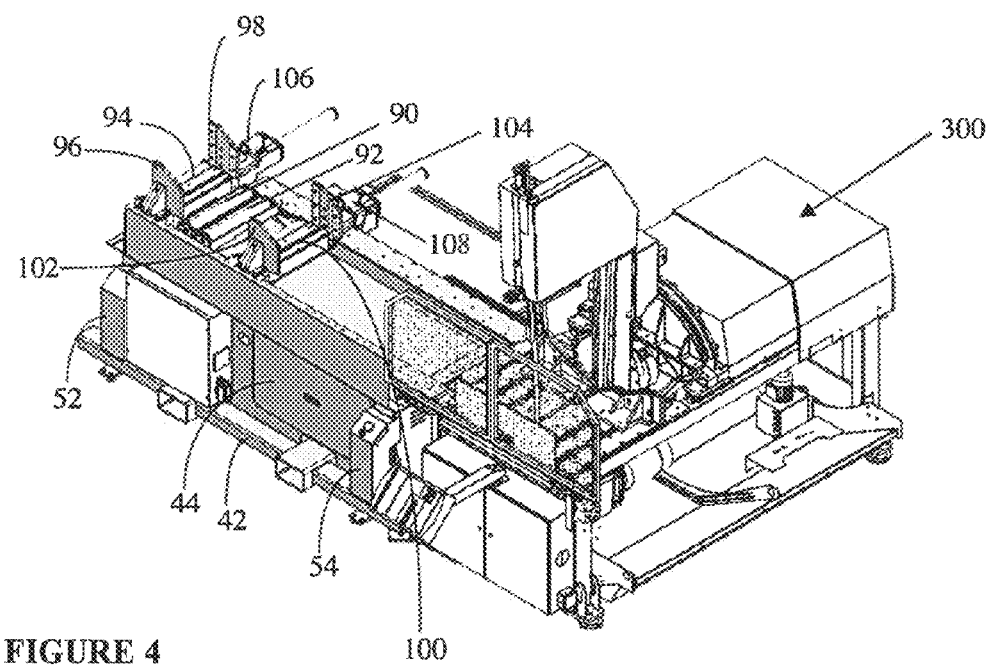
FIG. 4 is another perspective view of the feeding apparatus and the vertical band saw shown in FIG. 3.

As shown in FIGS. 3 and 4, the lifting base assembly 40 further includes a pair of removable hinge covers 52, 54 each extending upwardly from the base support frame 42 to house and protect an associated one of the hinges 46, 48 from external environment.

Figure 5:
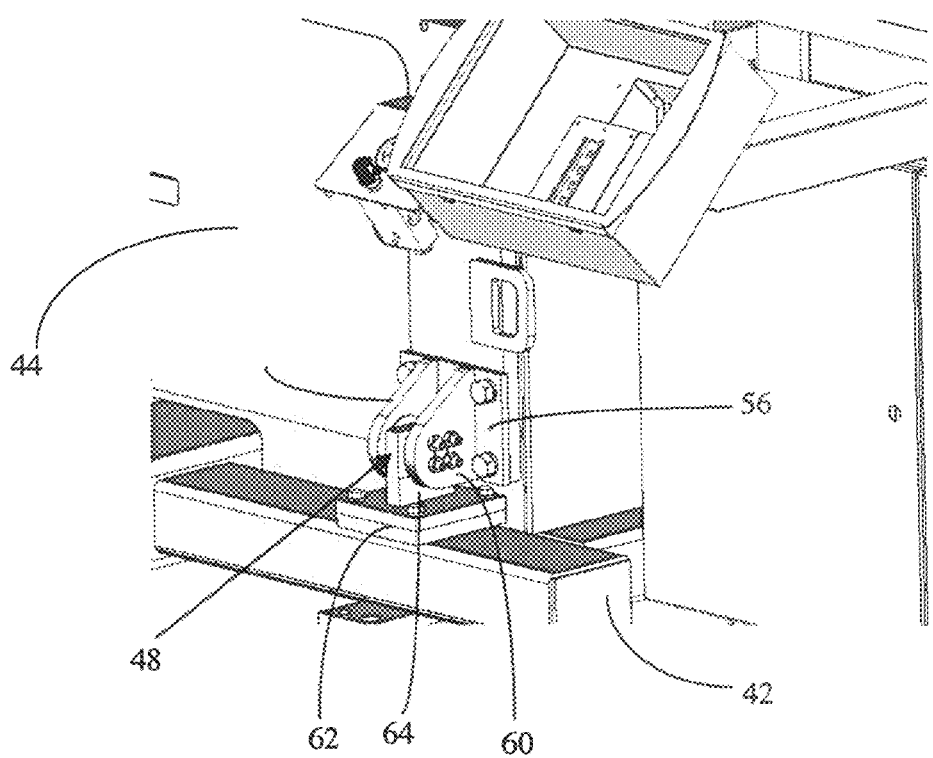
FIG. 5 is a perspective view of a base pivoting hinge of the feeding apparatus shown in FIG. 3.
Figure 6:
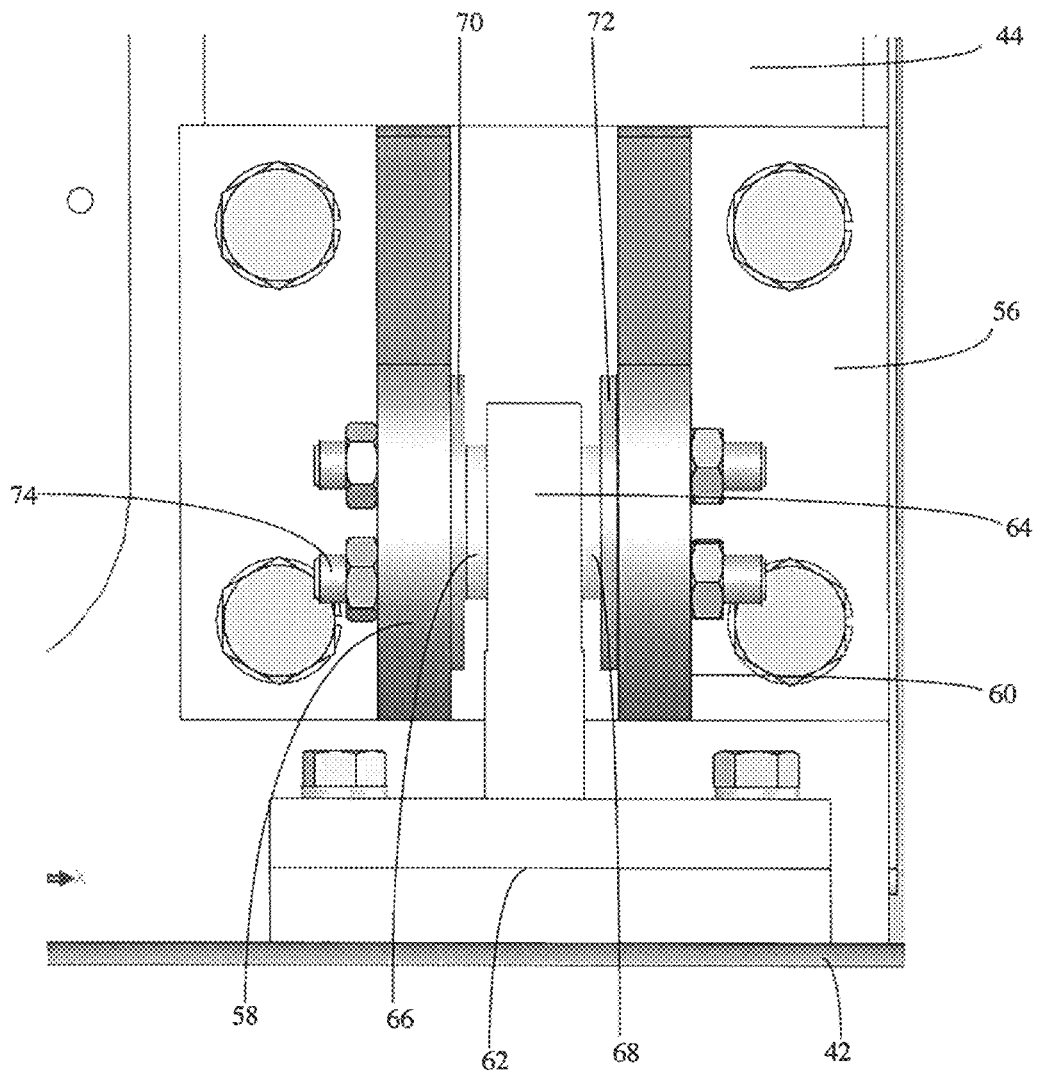
FIG. 6 is a lateral elevation view of the base pivoting hinge shown in FIG. 5.

Reference is made to FIGS. 5 and 6 which show the hinge 48 without the housing 54. The hinge 48 includes an upper clevis mounting plate 56 coupled to a lateral surface of the base platform 44 and a pair of opposed clevis arms 58, 60 extending laterally outwardly from the mounting plate 56, each said opposed clevis arms 58, 60 defining a coaxially oriented pin receiving apertures (not shown). The hinge 48 further includes a lower tang mounting plate 62 secured on an upper surface of the support frame 42 and a tang 64 extending generally upwardly from the tang mounting plate 62, and defines a pin receiving hole (not shown) in coaxial orientation with the pin receiving apertures. Thrust needle bearings 66, 68 are provided in abutting contact with associated outwardly oriented surfaces of the tang 64. The hinge 48 further includes pressure thrust washers 70, 72 each interposed between an associated one of the thrust needle bearings 66, 68 and an associated one of the clevis arms 58, 60. A clevis pin (not shown) is received through the pin receiving hole and apertures, and also in through holes defined by the bearings 66, 68 and the washers 70, 72. A plurality of set screws 74 threadably received inwardly through the clevis arms 58, 60 around the periphery of the pin receiving apertures urge against the associated pressure thrust washers 70, 72.

The other hinge 46 incorporates construction substantially identical to that of the hinge 48 as described above, and share the common rotating axis x. The applicant has appreciated that the hinges 46, 48 may permit for the relative rotational movement of the base platform 44 towards the rotated position while reducing play about the hinges 46, 48 and/or movement of the base platform 44 other than the rotational movement, such as transverse translational movement.

As more clearly seen in FIG. 2, similar to the hinges, 46, 48, the lifting cylinder 50 is coupled at one axial end to an upwardly oriented surface of the support frame 42 and at the other axial end to a laterally oriented surface of the base platform 44. The other lifting cylinder (not shown) is coupled to the support frame 42 and the base platform 44 the same way. As will be further detailed below, the lifting cylinders are selectively extendible substantially vertically to rotate the base platform 44 about the rotating axis x towards the rotated position.

As seen in FIG. 1, the pipe shuttling assembly 80 includes a pipe feeding track member 82 fixedly coupled to an upper portion of the base platform 44. The track member 82 defines an elongated downwardly oriented cavity 84 of generally rectangular cross section, and which longitudinally extends on the track member 82 between a pipe receiving end 86 and a pipe feeding end 88 to define a pipe feeding path extending therebetween. As also seen in FIGS. 3 and 4, the shuttling assembly 80 further includes: a pair of support rollers 90, 92 movably mounted in the elongated cavity 84; a squaring vise track 94 fixedly attached to the track member 82 adjacent to the receiving end 86 and a pair of squaring vises 96, 98 extending upwardly from the squaring vise track 94; and a shuttling vise track 100 movably coupled to the track member 82 and a pair of shuttling vises 102, 104 extending upwardly from the shuttling vise track 100.

The support rollers 90, 92 are movably positioned between the fixedly placed squaring vise track 94 towards the receiving end 86 and the shuffling vise track 100 towards the feeding end 88. The shuttling vise track 100, together with the shuttling vises 102, 104 thereon are movable along the length of the track member 82 and the pipe feeding path. Such movement of the shuttling vise track 100 is conducted by a servomotor (not shown) and a rack and pinion (not shown) driven by the servomotor. The support rollers 90, 92 are each independently rotatable along a respective rolling axis oriented substantially normal to the pipe feeding path, and with movement of a metal pipe 200 thereon, as will be further described below.

The squaring vise 98 and the shuttling vise 104 located generally above the second lateral portion 51 are operable as datum vises relatively fixedly attached on the associated squaring and shuttling vise tracks 94, 100. The other squaring and shuttling vises 96, 102 opposed to the vises 98, 104, respectively, are movably mounted on the respective vise tracks 94, 100, and are selectively movable transversely towards or away from the opposed vises 98, 104 to apply or remove a clamping force therebetween. The squaring and shuttling vises 98, 104 are respectively provided with associated squaring and shuttling vise hydraulic cylinders 106, 108 disposed laterally outwardly from the vises 98, 104 in substantial alignment with the associated vise tracks 94, 100. The vise cylinders 106, 108 provide for limited inward transverse movement of the associated datum vises 98, 104 towards a predefined longitudinal datum line (not shown) oriented substantially parallel to the pipe feeding path or away therefrom and the opposed vises 96, 102, with the maximum travel distance of the vises 98, 104 being about an inch. As will be further detailed below, respective upper surfaces of the squaring and shuttling vise tracks 94, 100 cooperatively define a metal pipe supporting plane along the pipe feeding path during the feeding of the metal pipe 200 by the feeding apparatus 10.

Figure 7:
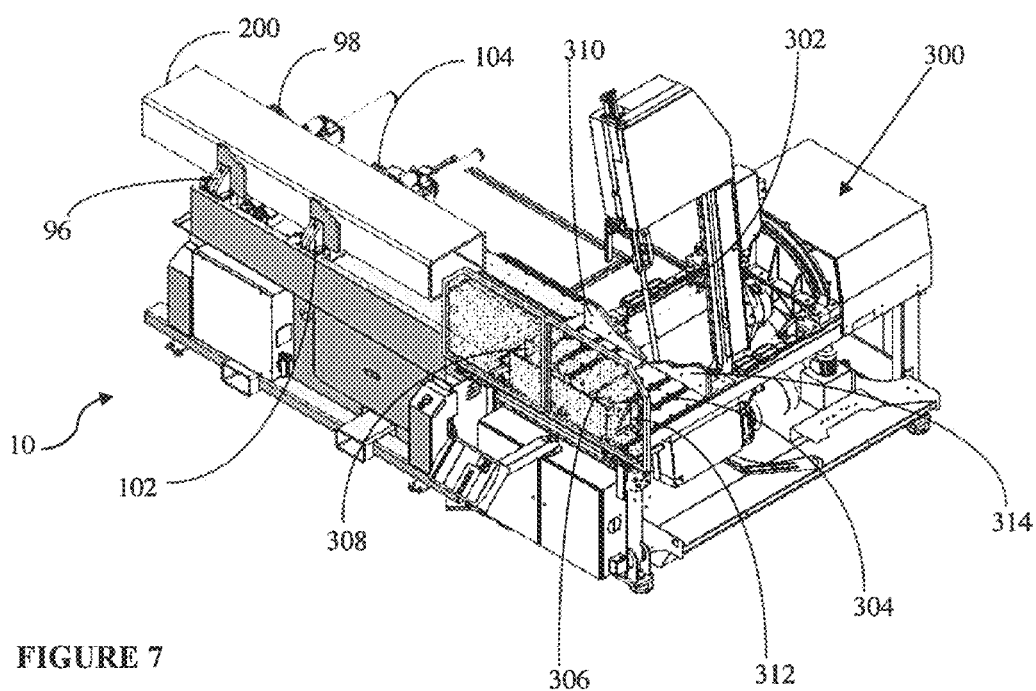
FIG. 7 is a perspective view of the feeding apparatus and the vertical band saw shown in FIGS. 3 and 4, and which includes an elongated square metal pipe disposed on the feeding apparatus for movement towards the vertical band saw.

Reference is now had to FIG. 7 which shows a perspective view of the feeding apparatus 10 in operational engagement with the vertical band saw 300. The band saw 300 includes a vertically traversing band saw blade 302 and a band saw cutting surface 304 defining a saw blade receiving slot 306 for receiving the blade 302 during a cutting operation. The band saw 300 also includes a pair of opposed rear band saw vises 308, 310 positioned rearwardly of the slot 306 and a pair of opposed forward band saw vises 312, 314 positioned forwardly of the slot 306, where the band saw vises 308, 310, 312, 314 extend upwardly on the cutting surface 304. The rear and forward band saw vises 310, 314 are fixedly secured on the cutting surface 304, and the rear and forward band saw vises 308, 312 are selectively movable towards or away from the transversely opposed rear and forward band saw vises 310, 314, respectively. In the operational engagement shown in FIG. 7, the feeding apparatus 10 is coupled to the band saw 300 with the feeding end 88 positioned adjacent to a rearward end of the cutting surface 304, such that the fixed band saw vises 310, 314 are positioned longitudinally along the second lateral portion 51, and the movable band saw vises 308, 312 are positioned longitudinally along the first lateral portion 49.

To receive or load the metal pipe 200 near the receiving end 86, the movable squaring and shuttling vises 96, 102 are moved away from the associated opposed vises 98, 104, and the datum vises 98, 104 retracted from the datum line and the vises 96, 102, and the shuttling vise track 100 and the rollers 90, 92 are moved towards the receiving end 86. The movable band saw vises 308, 312 are also retracted away from the opposed band saw vises 310, 314 to provide for a clear pipe feeding path to extend from the receiving end 86 to the feeding end 88, and further forwardly towards the cutting surface 304. Both the lifting cylinders 50 are fully retracted during loading, such that the base platform 44 is fully seated on the support frame 42 in the level position. In the level position, the metal pipe supporting plane cooperatively defined by respective upper surfaces of the squaring and shuttling vise tracks 94, 100 are substantially level with the ground, and, as more clearly seen in FIG. 8, substantially coplanar with the cutting surface 304.

As seen in FIG. 7, the metal pipe 200 is then placed longitudinally along the pipe feeding path on the vise tracks 94, 100 and the rollers 90, 92, and between the squaring vises 96, 98 and the shuttling vises 102, 104 near the receiving end 86. To reduce the load of the metal pipe 200 on the vise tracks 94, 100, the rollers 90, 92 are preferably resiliently biased upwardly past the upper surfaces of the vise tracks 94, 100.

Figure 8:
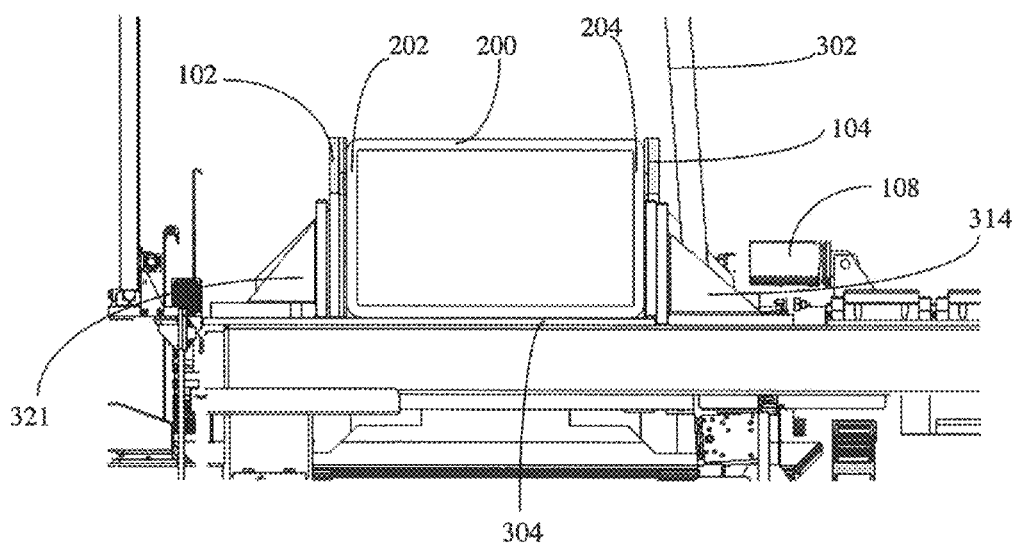
FIG. 8 is a partial front elevation view of the feeding apparatus, the vertical band saw and the metal pipe shown in FIG. 7, and which shows the feeding apparatus in a leveled position.
Figure 9:
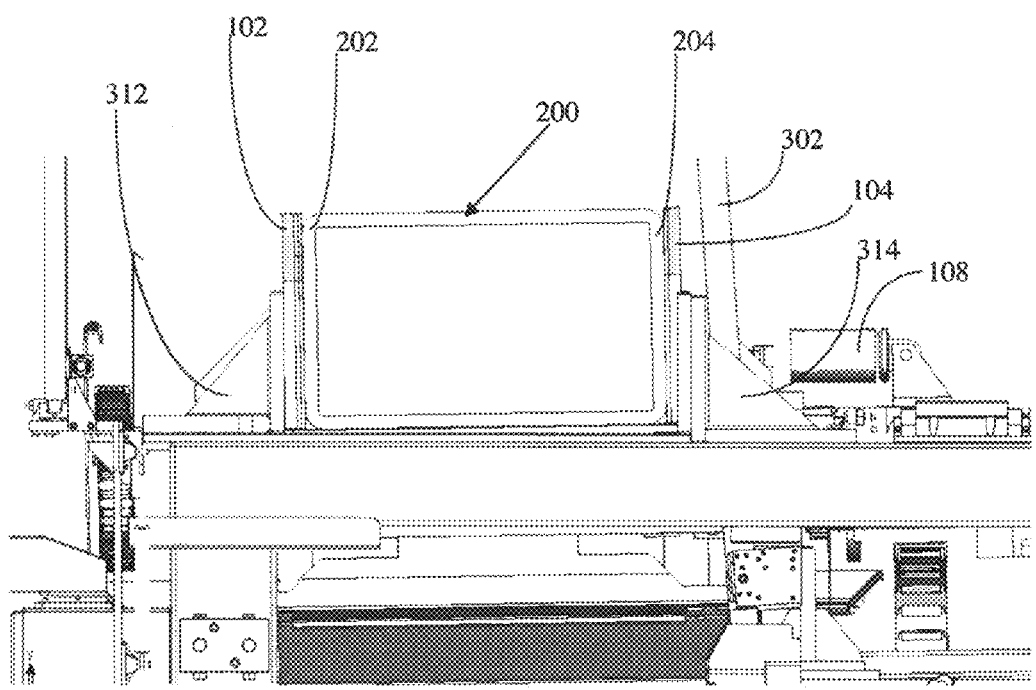
FIG. 9 is a partial front elevation view of the feeding apparatus, the vertical band saw and the metal pipe shown in FIG. 8, and which shows the feeding apparatus in a rotated position.
Figure 10:
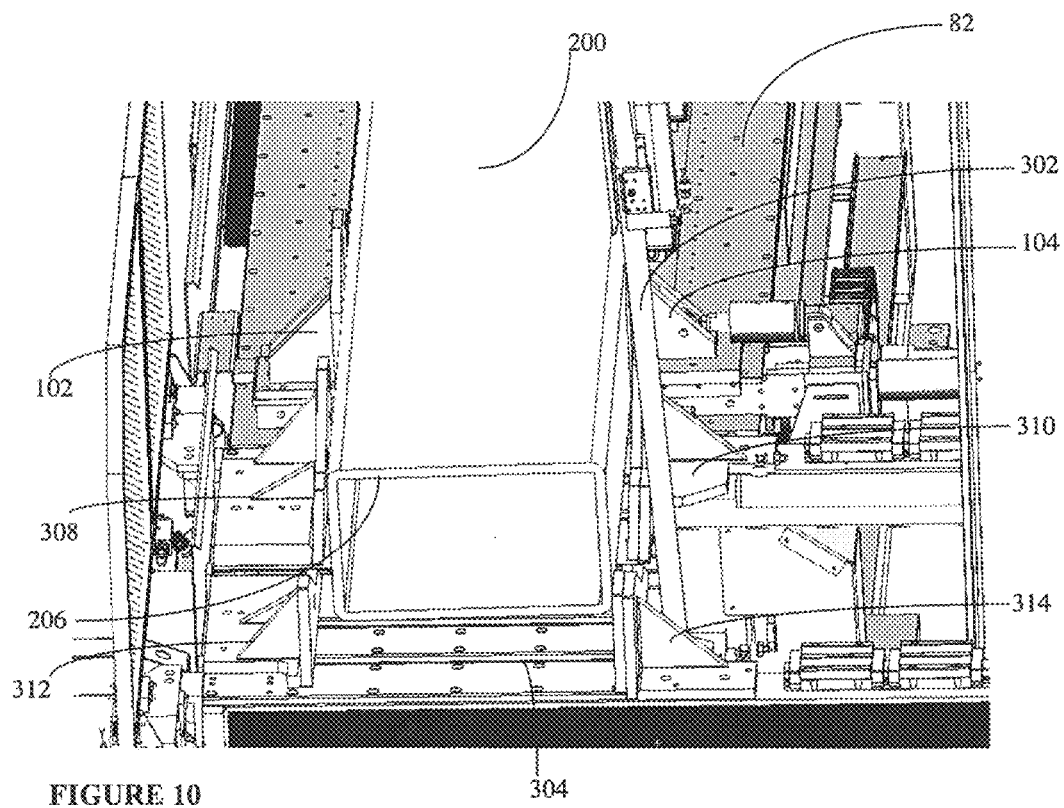
FIG. 10 is another partial perspective view of the feeding apparatus, the vertical band saw and the metal pipe shown in FIG. 9.

As seen in FIGS. 7 and 8, to feed the metal pipe 200 to the vertical band saw 300, the datum shuttling vise 104 is first moved inwardly to the datum line to align and abut against a first lateral sidewall 204 of the metal pipe 200 at the datum line, and the movable shuttling vise 102 is moved towards the datum shuttling vise 104 to frictionally engage the metal pipe 200 therebetween. With the metal pipe 200 clamped between the shuttling vises 102, 104, the lifting cylinders 50 are actuated to rotate the base platform 44 about the rotating axis x towards the rotated position. As seen in FIGS. 9 and 10, in the rotated position the metal pipe 200 is raised on the vise tracks 94, 100 from the cutting surface 304 about 0.23 inch along a second lateral sidewall 202 and about 0.54 inch along the first lateral sidewall 204, and the first sidewall 204 is spaced about 0.63 inch inwardly from the fixed band saw vises 310, 314. The movable band saw vises 308, 312 are also positioned laterally outwardly relative to the squaring and shuttling vises 96, 102, and away from the first sidewall 102.

Figure 12:
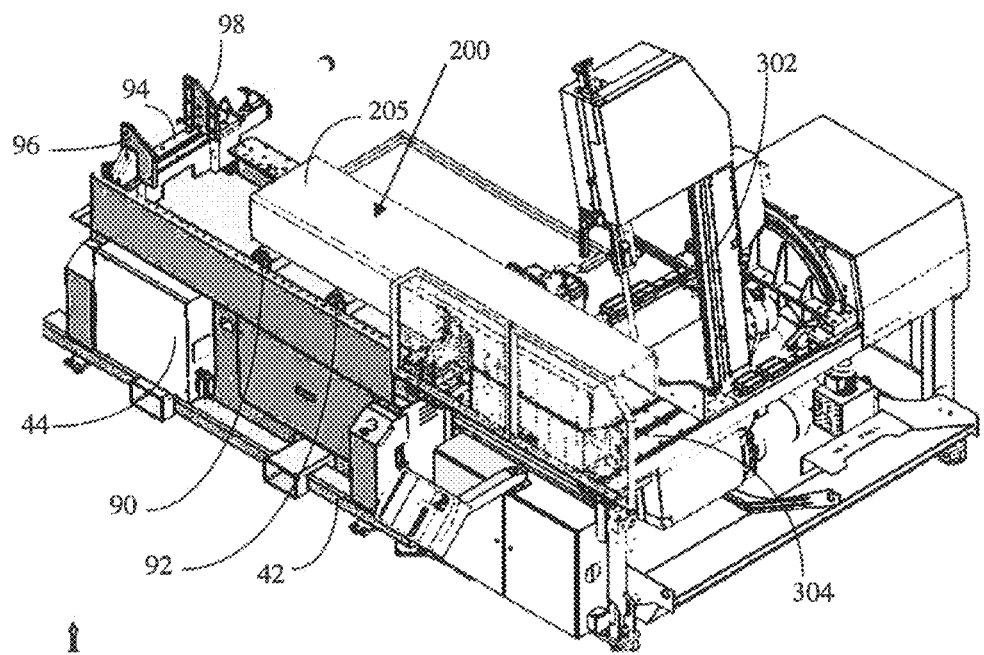
FIG. 12 is a perspective view of the feeding apparatus, the vertical band saw and the metal pipe shown in FIG. 11.

As seen in FIG. 12, the metal pipe 200 is then moved in the rotated position forwardly towards the feeding end 88 and onto the cutting surface 304 by the shuttling vises 102, 104 and the shuttling track 100, with the rollers 90, 92 also moving towards the feeding end 88 to support a trailing rear end 205 of the metal pipe 200. It is to be appreciated that for simplicity, the metal pipe 200 is shown as a single square metal pipe. The feeding apparatus 10 may in the alternative operate to feed a bundle of metal pipes held together by one or more of bundling straps along the length. The applicant has appreciated that the feeding apparatus 10 may permit for improved feeding of such bundles of metal pipes to the band saw 300, while reducing the possibility of the bundling straps getting caught on the band saw vices 308, 310, 312, 314 and the cutting surface 304, thereby reducing wear and tear on the band saw components, as well as inaccuracies in the feeding distance of the metal pipe.

Figure 11:
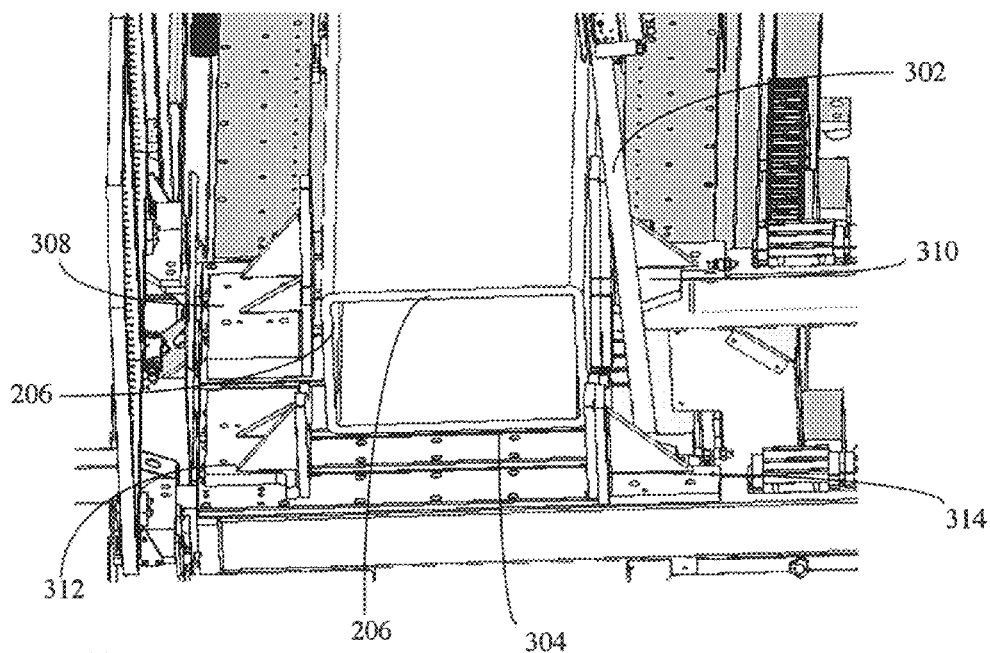
FIG. 11 is a partial perspective view of the feeding apparatus, the vertical band saw and the metal pipe shown in FIG. 10, and which shows the feeding apparatus returned to the leveled position.
Figure 13:
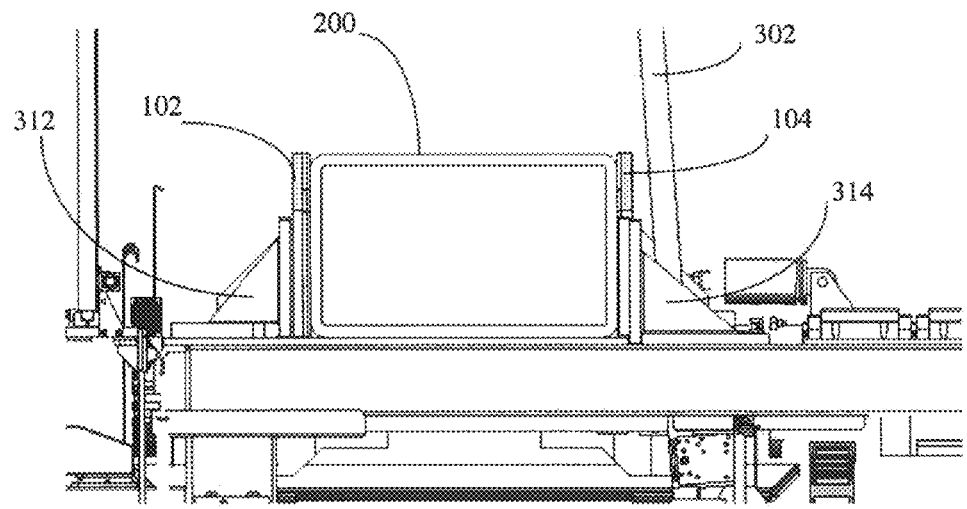
FIG. 13 is a partial front elevation view of the feeding apparatus, the vertical band saw and the metal pipe shown in FIGS. 11 and 12.
Figure 14:
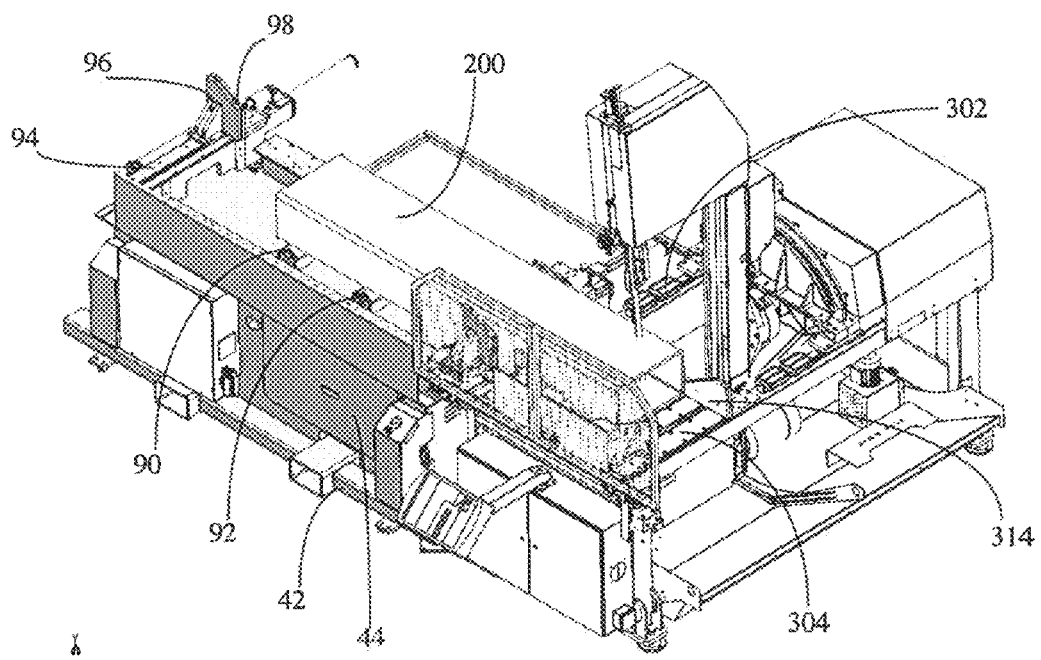
FIG. 14 is a perspective view of the feeding apparatus, the vertical band saw and the metal pipe shown in FIGS. 11 to 13, and which shows a vertical band saw blade of the band saw advanced into the pipe.
Figure 15:
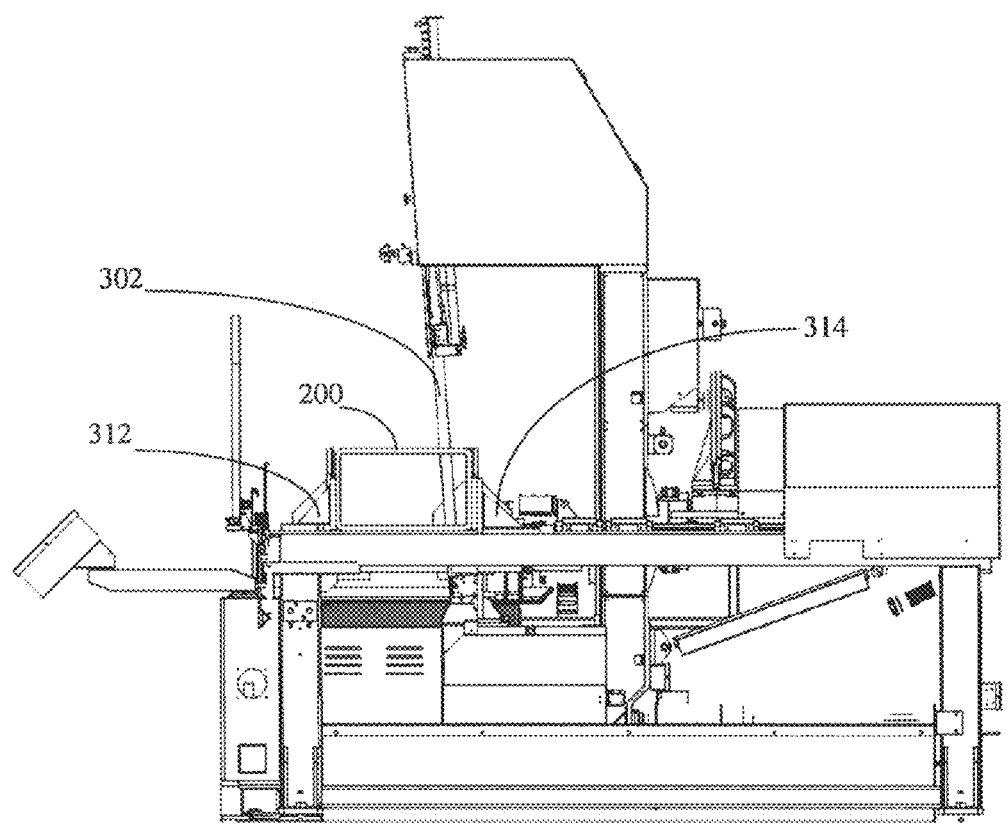
FIG. 15 is a front elevation view of the feeding apparatus, the vertical band saw and the metal pipe shown in FIG. 14.

As seen in FIGS. 11 and 13, once a forwardmost end 206 of the metal pipe 200 is moved a predetermined distance past the slot 306, the lifting cylinders are retracted to seat the base platform 44 on the support frame 42, such that a bottom surface of the metal pipe 200 contacts the cutting surface 304. Optionally, the movable shuttling vise 102 is moved laterally outwardly to release the metal pipe 200, with the datum shuttling vise 104 also retracting from the datum line, and the shuttling vise track 100, together with the vises 102, 104, and the rollers 90, 92 are returned towards the receiving end 86. As seen in FIGS. 14 and 15, the movable band saw vises 308, 312 are moved towards the opposed band saw vises 310, 314 to clamp the metal pipe 200 therebetween, and the metal pipe 200 is cut along the slot 306 by advancing the band saw blade 302 into the slot 306. To prevent inadvertent loading of another metal pipe during the cutting operation, the squaring vise 96 is moved to contact and close against the opposed vise 98.

It is to be appreciated that for added stability of the metal pipe 200 during the cutting operation, the shuttling vises 102, 104 may remain adjacent to the feeding end 88 with the metal pipe 200 clamped therebetween as the metal pipe 200 is being cut with the band saw 300. Furthermore, the apparatus 10 may be configured for either a single stroke or multi stroke operation of the shuttling track 100 and the shuttling vises 102, 104. Namely, if a work piece to be cut from the metal pipe 200 is shorter than the maximum longitudinal distance of travel of the shuttling track 100 and the shuttling vises 102, 104 on the track member 82, the apparatus 10 may operate in the single stroke mode to move the metal pipe 200 towards the feeding end 88 only once. If not, the apparatus may operate in the multi stroke mode to move the metal pipe 200 towards the feeding end 88 in multiple movement or stroke cycles until the desired length of the metal pipe 200 is placed past the slot 306.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A method for feeding an elongated material generally along a length thereof towards a cutting device having a upwardly oriented cutting surface, the method comprising:
   placing the elongated material on the material feeding track member of an apparatus for feeding an elongated material generally along a length thereof towards a cutting device having an upwardly oriented cutting surface and between a pair of opposed shuttling vises with the length of the material in
   general alignment with a feeding path, wherein the apparatus having a material shuttling assembly for effecting longitudinal movement of the material along the feeding path towards the cutting device, and a lifting base assembly coupled to the material shuttling assembly for effecting partial rotational movement thereof, wherein:
      the lifting base assembly comprises a lower base portion and an upper base portion hingedly coupled to the lower base portion along a base pivoting axis generally parallel to and laterally offset from the feeding path, the upper base portion being selectively rotatable about the base pivoting axis relative to the lower base portion between a level position and a lifted position, and
      the material shuttling assembly comprises a material feeding track member coupled to the upper base portion and the pair of opposed shuttling vises selectively movable relative to the track member along the feeding path, the track member at least partially defining a material supporting plane along the feeding path, and the shuttling vises being operable for holding or clamping the material therebetween and moving the material on the track member along the feeding path and over the supporting plane towards the cutting device when the upper base portion is in the lifted position,
      wherein in the lifted position, the material supporting plane is raised relative to the cutting surface in an angled orientation thereto, wherein the supporting plane is further raised along a first lateral end portion relative to a second lateral end portion opposed to the first lateral end portion, the second lateral end portion being proximal to the base pivoting axis, and thereby permitting the longitudinal movement of the material over the cutting surface substantially without sliding contact or with partial sliding contact therebetween;
   actuating the shuttling vises to clamp the material therebetween and rotating the upper base portion relative to the lower base portion towards the lifted position;
   moving the shuttling vises and the material clamped therebetween a predetermined distance towards the cutting device substantially without sliding contact or with partial sliding contact between the material and the cutting device, whereby a predetermined cutting length of the material is positioned over the cutting surface; and
   rotating the upper base portion relative to the lower base portion towards the level position, thereby placing the material on the cutting surface.

2. A material cutting assembly for cutting an elongated material along a length thereof, the material cutting assembly comprising an apparatus for feeding an elongated material generally along a length thereof towards a cutting device having an upwardly oriented cutting surface, wherein the cutting device is coupled or positioned adjacent thereto, the apparatus having a material shuttling assembly for effecting longitudinal movement of the material along a feeding path towards the cutting device, and a lifting base assembly coupled to the material shuttling assembly for effecting partial rotational movement thereof, wherein:
   the lifting base assembly comprises a lower base portion and an upper base portion hingedly coupled to the lower base portion along a base pivoting axis generally parallel to and laterally offset from the feeding path, the upper base portion being selectively rotatable about the base pivoting axis relative to the lower base portion between a level position and a lifted position, and
   the material shuttling assembly comprises a material feeding track member coupled to the upper base portion and a pair of opposed shuttling vises selectively movable relative to the track member along the feeding path, the track member at least partially defining a material supporting plane along the feeding path, and the shuttling vises being operable for holding or clamping the material therebetween and moving the material on the track member along the feeding path and over the supporting plane towards the cutting device when the upper base portion is in the lifted position,
   wherein in the lifted position, the material supporting plane is raised relative to the cutting surface in an angled orientation thereto, wherein the supporting plane is further raised along a first lateral end portion relative to a second lateral end portion opposed to the first lateral end portion, the second lateral end portion being proximal to the base pivoting axis, and thereby permitting the longitudinal movement of the material over the cutting surface substantially without sliding contact or with partial sliding contact therebetween.

3. An apparatus for feeding a material towards a cutting device having an upwardly oriented cutting surface, the apparatus having a material shuttling assembly for effecting movement of the material along a feeding path towards the cutting device, and a lifting base assembly coupled to the material shuttling assembly for effecting partial rotational movement thereof, wherein:
   the lifting base assembly is selectively rotatable about a base pivoting axis generally parallel to and laterally offset from the feeding path between a level position and a lifted position, and
   the material shuttling assembly comprises a material feeding track member coupled to the lifting base assembly and a pair of opposed shuttling clamping members selectively movable on the track member along the feeding path, the track member at least partially defining a material supporting plane along the feeding path, and the shuttling clamping members being operable for clamping the material therebetween and moving the material on the track member along the feeding path and over the supporting plane towards the cutting device when the material shuttling assembly is in the lifted position,
   wherein in the lifted position, the material supporting plane is raised relative to the cutting surface in an angled orientation thereto, whereby the supporting plane is further raised along a first lateral end portion relative to a second lateral end portion opposed to the first lateral end portion, the second lateral end portion being proximal to the base pivoting axis, and thereby permitting the movement of the material over the cutting surface substantially without sliding contact or with partial sliding contact therebetween.

4. The apparatus of claim 3, wherein the material feeding track member comprises a material receiving end and a material feeding end, the feeding path extending between the material receiving and feeding ends, and the material feeding end being positionable adjacent to the cutting device, wherein in the level position, the material supporting plane is substantially coplanar with the cutting surface.

5. The apparatus of claim 4, wherein the shuttling clamping members are shuttling vises, and the material is an elongated material, and wherein the material shuttling assembly further comprises a pair of opposed squaring vices for guiding or orienting the elongated material on the material feeding track member along the feeding path, the squaring vices being fixedly located on the material feeding track member adjacent to the material receiving end, wherein the shuttling vises are selectively movable between the squaring vises and the material feeding end.

6. The apparatus of claim 5, wherein the material shuttling assembly further comprises transversely extending squaring and shuttling vise tracks each defining a respective upwardly oriented track surface, the squaring vises being disposed on the track surface of the squaring vise track and the shuttling vises being disposed on the track surface of the shuttling vise track, wherein at least one of said squaring vices are selectively movable towards other said squaring vises, and at least one of said shuttling vises are selectively movable towards other said shuttling vises, and wherein the track surfaces and the material feeding track member cooperatively define the material supporting plane.

7. The apparatus of claim 5, wherein the material feeding track member defines an elongated downwardly open recess substantially aligned with the feeding path, and the material shuttling assembly further comprises one or more material supporting rollers rotatable about a respective rotation axis oriented substantially normal to the feeding path, the rollers being fixedly or movably disposed in the recess along the feeding path to receive the material thereon along the material supporting plane and at least partially assist the movement of the material towards the cutting device.

8. The apparatus of claim 5, wherein the cutting device is a vertical, horizontal or scissors type band saw, the band saw comprising a fixed band saw vise and a transversely movable band saw vise each extending upwardly from the cutting surface, wherein the band saw is positionable adjacent to the apparatus with the fixed band saw vise located proximal to the first lateral end portion of the material supporting plane.

9. The apparatus of claim 8, wherein one said shuttling vise is a datum shuttling vise, the apparatus being positionable adjacent to the band saw with the datum shuttling vise substantially aligned with the fixed band saw vice in the level position proximal to the first lateral end portion of the material supporting plane, wherein in the lifted position, the datum shuttling vise is tilted transversely inwardly towards the feeding path relative to the fixed band saw vice, thereby permitting the movement of the material over the cutting surface substantially without sliding contact or with partial sliding contact between the material, and the cutting surface and the fixed band saw vise.

10. The apparatus of claim 3, wherein the lifting base assembly comprises a lower base portion and an upper base portion hingedly coupled to the lower base portion along the base pivoting axis, the upper base portion being selectively rotatable about the base pivoting axis relative to the lower base portion between the level position and the lifted position, and wherein the lifting base assembly further comprises a base pivoting hinge coupled to the lower and upper base portions proximal to the second lateral end portion of the material supporting plane, the hinge defining the base pivoting axis, and the lifting base assembly further comprises a lifting actuator coupled to the lower and upper base portions proximal to the first lateral end portion opposite the base pivoting axis, wherein the lifting actuator is for rotating the upper base portion relative to the lower base portion about the pivoting axis towards the lifted position.

11. The apparatus of claim 10, wherein the base pivoting hinge comprises a clevis hinge assembly having a pair of thrust needle bearings, a clevis coupled to one said base portion, a tang coupled to other said base portion and a clevis pin rotatably coupling the clevis and the tang, wherein the clevis comprises a pair of clevis arm portions, and each said thrust needle bearing is interposed between an associated one of said clevis arm portions and the tang.

12. The apparatus of claim 11, wherein the clevis hinge assembly further comprises a plurality of set screws and a pair of pressure thrust washers, each said pressure thrust washer being disposed adjacent to an associated one of said clevis arm portions and in abutting contact with an associated one of said thrust needle bearings, wherein the set screws are received through associated screw receiving bores defines by the clevis arm portions to urge inwardly against associated said pressure thrust washers.

13. An apparatus for feeding an elongated material generally along a length thereof towards a cutting device having an upwardly oriented cutting surface, the apparatus having a material shuttling assembly for effecting longitudinal movement of the material along a feeding path towards the cutting device, and a lifting base assembly coupled to the material shuttling assembly for effecting partial rotational movement thereof, wherein:
    the lifting base assembly comprises a lower base portion and an upper base portion hingedly coupled to the lower base portion along a base pivoting axis generally parallel to and laterally offset from the feeding path, the upper base portion being selectively rotatable about the base pivoting axis relative to the lower base portion between a level position and a lifted position, and
    the material shuttling assembly comprises a material feeding track member coupled to the upper base portion and a pair of opposed shuttling vises selectively movable relative to the track member along the feeding path, the track member at least partially defining a material supporting plane along the feeding path, and the shuttling vises being operable for holding or clamping the material therebetween and moving the material on the track member along the feeding path and over the supporting plane towards the cutting device when the upper base portion is in the lifted position,
    wherein in the lifted position, the material supporting plane is raised relative to the cutting surface in an angled orientation thereto, wherein the supporting plane is further raised along a first lateral end portion relative to a second lateral end portion opposed to the first lateral end portion, the second lateral end portion being proximal to the base pivoting axis, and thereby permitting the longitudinal movement of the material over the cutting surface substantially without sliding contact or with partial sliding contact therebetween.

14. The apparatus of claim 13, wherein the material feeding track member comprises a material receiving end and a material feeding end, the feeding path extending between the material receiving and feeding ends, and the material feeding end being positionable adjacent to the cutting device, wherein in the level position, the material supporting plane is substantially coplanar with the cutting surface.

15. The apparatus of claim 14, wherein the material shuttling assembly further comprises a pair of opposed squaring vices for guiding or orienting the elongated material on the material feeding track member along the feeding path, the squaring vices being fixedly located on the material feeding track member adjacent to the material receiving end, wherein the shuttling vises are selectively movable between the squaring vises and the material feeding end.

16. The apparatus of claim 15, wherein the material shuttling assembly further comprises a servomotor and a rack and pinion, the rack being coupled to the shuttling vises and the pinion being selectively actuable by the servomotor to drive the rack and the shuttling vises couple thereto towards the material feeding or receiving end.

17. The apparatus of claim 15, wherein the material shuttling assembly further comprises transversely extending squaring and shuttling vise tracks each defining a respective upwardly oriented track surface, the squaring vises being disposed on the track surface of the squaring vise track and the shuttling vises being disposed on the track surface of the shuttling vise track, wherein at least one of said squaring vices are selectively movable towards other said squaring vises, and at least one of said shuttling vises are selectively movable towards other said shuttling vises, and wherein the track surfaces and the material feeding track member cooperatively define the material supporting plane.

18. The apparatus of claim 17, wherein the material shuttling assembly further comprises an upper clamping arm selectively movable towards the shuttling vise track to urge the elongated material thereto at least partially during the longitudinal movement of the material towards the cutting device, the upper clamping arm being selectively movable in tandem with the shuttling vises and the shuttling vise track.

19. The apparatus of claim 13, wherein the material feeding track member defines an elongated downwardly open recess substantially aligned with the feeding path, and the material shuttling assembly further comprises one or more material supporting rollers rotatable about a respective rotation axis oriented substantially normal to the feeding path, the rollers being fixedly or movably disposed in the recess along the feeding path to receive the material thereon along the material supporting plane and at least partially assist the longitudinal movement of the material towards the cutting device.

20. The apparatus of claim 13, wherein the cutting device is a vertical, horizontal or scissors type band saw, the band saw comprising a fixed band saw vice and a transversely movable band saw vice each extending upwardly from the cutting surface, wherein the band saw is positionable adjacent to the apparatus with the fixed band saw vice located proximal to the first lateral end portion of the material supporting plane.

21. The apparatus of claim 20, wherein one said shuttling vise is a datum shuttling vise, the apparatus being positionable adjacent to the band saw with the datum shuttling vise substantially aligned with the fixed band saw vice in the level position proximal to the first lateral end portion of the material supporting plane, wherein in the lifted position, the datum shuttling vise is tilted transversely inwardly towards the feeding path relative to the fixed band saw vice, thereby permitting the longitudinal movement of the material over the cutting surface substantially without sliding contact or with partial sliding contact between the material, and the cutting surface and the fixed band saw vise.

22. The apparatus of claim 20, wherein in the lifted position, the first lateral end portion of the material supporting plane is raised relative to the cutting surface between about 0.05 inch and about 1.5 inch, the second lateral end portion is raised relative to the cutting surface between about 0.01 inch and about 1.0 inch, and the datum shuttling vise is inwardly distanced transversely from the fixed band saw vise between about 0.05 inch and about 1.5 inch.

23. The apparatus of claim 13, wherein the elongated material comprises a plurality of metal bars or tubes and one or more bundling straps, the bundling straps holding the metal bars or tubes in a bundled arrangement, wherein the bars or tubes have a length between about 1 inch and about 60 feet.

24. The apparatus of claim 13, wherein the lifting base assembly further comprises a base pivoting hinge coupled to the lower and upper base portions proximal to the second lateral end portion of the material supporting plane, the hinge defining the base pivoting axis, and the lifting base assembly further comprises a lifting actuator coupled to the lower and upper base portions proximal to the first lateral end portion opposite the base pivoting axis, wherein the lifting actuator is for rotating the upper base portion relative to the lower base portion about the pivoting axis towards the lifted position.

25. The apparatus of claim 24, wherein the base pivoting hinge comprises a clevis hinge assembly having a pair of thrust needle bearings, a clevis coupled to one said base portion, a tang coupled to other said base portion and a clevis pin rotatably coupling the clevis and the tang, wherein the clevis comprises a pair of clevis arm portions, and each said thrust needle bearing is interposed between an associated one of said clevis arm portions and the tang.

26. The apparatus of claim 1, wherein the clevis hinge assembly further comprises a plurality of set screws and a pair of pressure thrust washers, each said pressure thrust washer being disposed adjacent to an associated one of said clevis arm portions and in abutting contact with an associated one of said thrust needle bearings, wherein the set screws are received through associated screw receiving bores defines by the clevis arm portions to urge inwardly against associated said pressure thrust washers.

* * * * *